J. C. GITHENS.
Tripod for Rock-Drills.
No. 167,659. Patented Sept. 14, 1875.
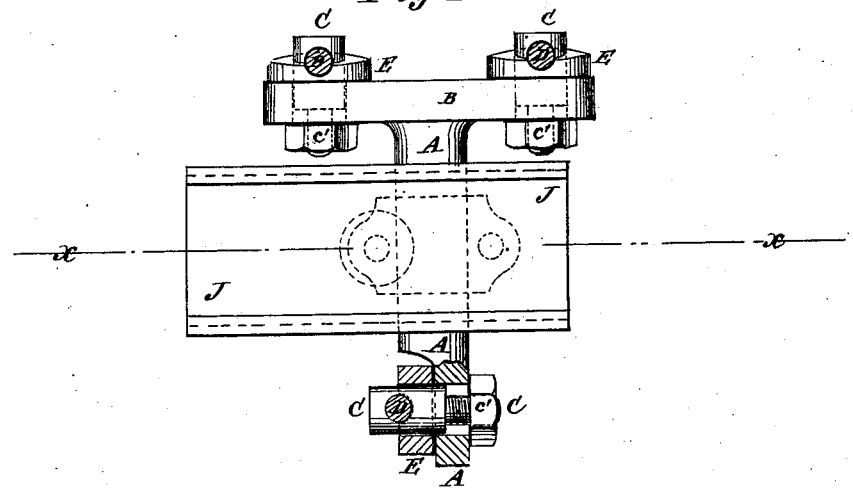
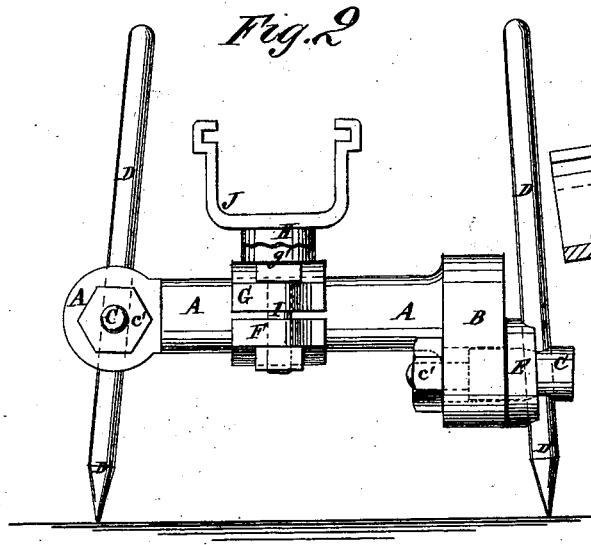
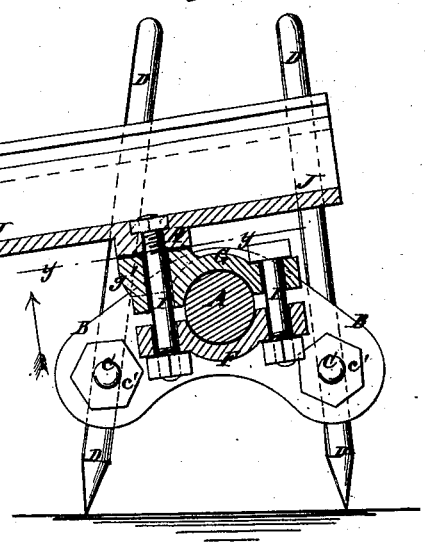
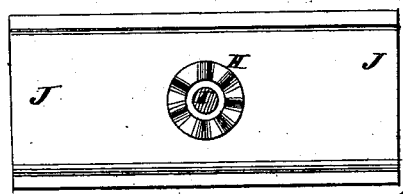
WITNESSES:
N. W. Almqvist
A. F. Terry
INVENTOR:
Joseph C. Githens
BY
ATTORNEYS.

UNITED STATES PATENT OFFICE.

JOSEPH C. GITHENS, OF NEW YORK, N. Y.

IMPROVEMENT IN TRIPODS FOR ROCK-DRILLS.

Specification forming part of Letters Patent No. 167,659, dated September 14, 1875; application filed June 19, 1875.

*To all whom it may concern:*

Be it known that I, JOSEPH C. GITHENS, of the city, county, and State of New York, have invented a new and useful Improvement in Tripod and Clamp for Steam Rock-Drills, of which the following is a specification:

Figure 1 is a top view of my improved tripod and clamp, showing the shield attached to it. Fig. 2 is a rear view of the same. Fig. 3 is a detail vertical section of the same, taken through the line $x\,x$, Fig. 1. Fig. 4 is a detail section of the clamp, taken through the line $y\,y$, Fig. 3.

Similar letters of reference indicate corresponding parts.

The object of this invention is to furnish an improved tripod and clamp for holding the shield, in which the steam-cylinder of a steam rock-drill moves up and down, which shall be so constructed as to hold the cylinder securely while the drill is being used, and which will enable the drill to be adjusted to work at any desired level and at any desired angle.

The invention will first be described in connection with drawing, and then pointed out in the claim.

A is a short shaft, upon one end of which is formed a cross-head, B. Through the end of the shaft A, and through the ends of the cross-head B, are passed three horizontal bolts, C, which have transverse holes formed through their rear ends to receive the legs D, which legs rest in half-round notches formed in the outer sides of the washers E, through which the said bolts C pass, and the other sides of which rest against the ends of the shaft A and cross-head B. The legs D and washers E are secured in place when adjusted by nuts $c'$ screwed upon the forward ends of the said bolts C. The legs D are solid pointed rods of steel, or of wrought-iron pointed with steel. By this construction, by loosening the nuts of the bolts C, the legs D may be slid longitudinally through the bolts C, to support the drill at any desired elevation. The clamp consists of three principal parts, F G H, and two bolts, I. The parts F G have half-round notches formed in the adjacent faces of their middle parts to fit upon the shaft A, and holes through their ends to receive the bolts I, by which they are secured to each other and to the said shaft A. Upon the outer side of one end of the piece G is formed a circular projection, $g'$, through the center of which the bolt I passes, and the face of which is corrugated radially, as shown in Fig. 2. H is a similar circular projection, formed upon or rigidly attached to the shield J. The face of the projection H is also corrugated radially to correspond with and fit into the corrugations of the projection $g'$, and has a hole formed through its center for the passage of the bolt I. By this construction, by loosening the nuts of the bolts I, the drill may be adjusted to drill a hole at any desired angle. The clamp F G $g'$ H I also enables the drill to be secured to a vertical shaft or column, and moved up and down upon said column or shaft, as may be desired.

Having thus described my invention, I claim as new and desire to secure by Letters Patent—

The tripod, formed by the combination of the shaft A, having a cross-head, B, upon one end, the three bolts C, having transverse holes through their ends, the three pointed solid legs D, and the washers E, having half-round notches formed in their outer sides with each other, substantially as herein shown and described.

JOSEPH C. GITHENS.

Witnesses:
JAMES T. GRAHAM,
T. B. MOSHER.